US010650500B2

(12) United States Patent
Lai et al.

(10) Patent No.: US 10,650,500 B2
(45) Date of Patent: May 12, 2020

(54) IMAGE LOCAL CONTRAST ENHANCEMENT METHOD

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Ching-hong Lai, Guangdong (CN); Shen-sian Syu, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 220 days.

(21) Appl. No.: 15/735,944

(22) PCT Filed: Nov. 23, 2017

(86) PCT No.: PCT/CN2017/112468
§ 371 (c)(1),
(2) Date: Dec. 12, 2017

(87) PCT Pub. No.: WO2019/071734
PCT Pub. Date: Apr. 18, 2019

(65) Prior Publication Data
US 2019/0385286 A1 Dec. 19, 2019

(30) Foreign Application Priority Data

Oct. 12, 2017 (CN) .......................... 2017 1 0950301

(51) Int. Cl.
*G06T 5/00* (2006.01)
*G06T 5/40* (2006.01)
(Continued)

(52) U.S. Cl.
CPC ............... *G06T 5/008* (2013.01); *G09G 5/10* (2013.01); *G09G 2320/066* (2013.01); *G09G 2360/16* (2013.01)

(58) Field of Classification Search
CPC combination set(s) only.
See application file for complete search history.

(56) References Cited

U.S. PATENT DOCUMENTS

2007/0092137 A1 4/2007 Zhao et al.
2009/0225121 A1* 9/2009 Miyamoto ............. B41J 2/2054
347/15
(Continued)

FOREIGN PATENT DOCUMENTS

CN 101639936 A 2/2010
CN 101706953 A 5/2010

*Primary Examiner* — Wesner Sajous
(74) *Attorney, Agent, or Firm* — Hemisphere Law, PLLC; Zhigang Ma (57) ABSTRACT

An image local contrast enhancement method includes: obtaining a first block where a pixel is located and a second block adjacent to the first block, and a gray scale source of a third block; obtaining a source gray scale of a fourth block opposite to the first block; respectively calculating a linear interpolation value according to the source gray scale and a distance between the pixel and the first block, the second block, the third block, and the fourth block; calculating a nonlinear interpolation value of the linear interpolation value by a nonlinear function; performing weighted calculation on the nonlinear interpolation value to obtain a target gray scale. The disclosure increases the diagonal blocks in the local gray scale adjustment, reflects the diagonal direction of the image, enhances the display effect of the local contrast in the smoothing process, enhances the edge image display effect, and improves the user experience.

18 Claims, 5 Drawing Sheets

(51) Int. Cl.
*G06T 3/40* (2006.01)
*G06T 3/20* (2006.01)
*G09G 5/10* (2006.01)

(56) References Cited

U.S. PATENT DOCUMENTS

| | | | |
|---|---|---|---|
| 2010/0189349 A1* | 7/2010 | Miyasaki | G09G 3/2007 382/167 |
| 2011/0222767 A1* | 9/2011 | Mitsunaga | H04N 1/6027 382/169 |
| 2012/0183208 A1* | 7/2012 | Sharman | G06T 3/4007 382/162 |
| 2012/0320045 A1* | 12/2012 | Yao | G06T 7/50 345/419 |
| 2014/0300721 A1* | 10/2014 | Imamura | H04N 5/2256 348/77 |
| 2018/0103892 A1* | 4/2018 | Kaur | A61B 5/444 |

\* cited by examiner

|   |   |   |
|---|---|---|
| 1 | 0 | 0 |
| 0 | 1 | 0 |
| 0 | 0 | 1 |

FIG. 7

|   |   |   |
|---|---|---|
| 0 | 0 | 0 |
| 1 | 1 | 1 |
| 0 | 0 | 0 |

FIG. 8

|   |   |   |
|---|---|---|
| 0 | 1 | 0 |
| 0 | 1 | 0 |
| 0 | 1 | 0 |

FIG. 9

IMAGE LOCAL CONTRAST ENHANCEMENT METHOD

RELATED APPLICATIONS

The present application is a National Phase of International Application Number PCT/CN2017/112468, filed Nov. 23, 2017, and claims the priority of China Application No. 201710950301.4, filed Oct. 12, 2017.

FIELD OF THE DISCLOSURE

The disclosure relates to a display technical field, and more particularly to a display panel and a display device.

BACKGROUND

Contrast enhancement algorithms for images have important applications in many fields, especially in medical images because the visual inspection of medical images is necessary in the diagnosis of many diseases. Due to their own and imaging conditions, the image contrast of the medical image is very low. Therefore, a great deal of research has been carried out in this area. This enhancement algorithm generally follows certain visual principles. It is well known that the human eye is sensitive to high-frequency signals (at the edges, etc.). Although information details are often high-frequency signals, they are often embedded in a large number of low-frequency background signals, so that their visual visibility is reduced. Therefore, the appropriate increase of high-frequency part of the visual effects can be improved and in favor of diagnosis.

In this regard, the traditional linear contrast pull-up and histogram equalization are the most widely used global image enhancement methods. Contrast pull-up linearly adjusts the dynamic range of the image, and the histogram equalization algorithms use the cumulative histogram distribution probability to remap image data. Although these methods are simple, but did not take into account the local information. Also, global histogram equalization (GHE) is also generated so that some noise is over-emphasized.

Figure 1:
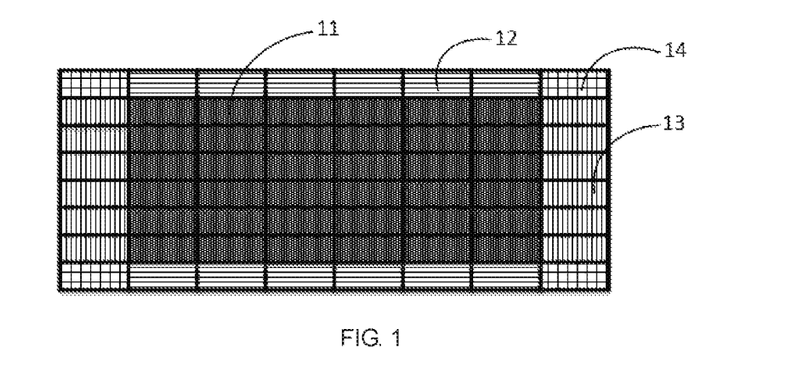
FIG. 1 is a prior art block diagram of the image.
Figure 2:
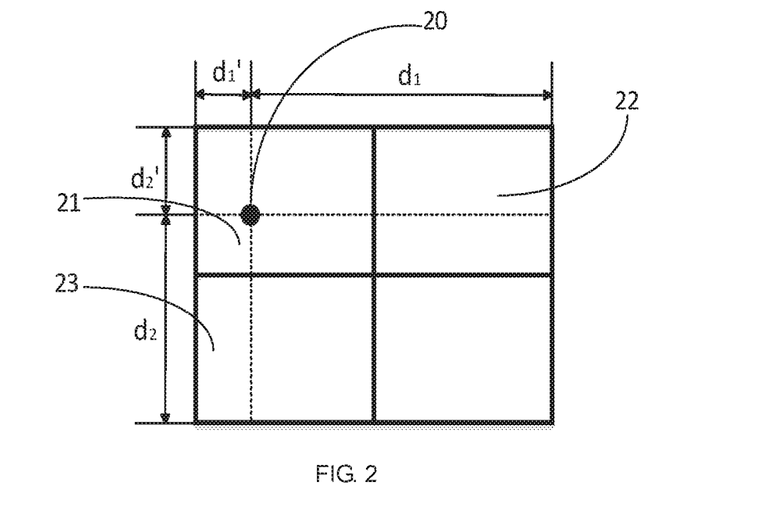
FIG. 2 is a prior art bilinear interpolation algorithm calculation diagram.

There are two ways in which local contrast enhancement is best known. One is adaptive histogram equalization (AHE), and the other is adaptive contrast enhancement (ACE). This changes the contrast of the image but requires a lot of computation. Later someone used the bilinear linear interpolation technique to overcome this problem. FIG. 1 is a schematic diagram of schematic block image of a prior art. FIG. 2 is a schematic diagram of bilinear interpolation algorithm of the prior art. In conjunction with FIGS. 1 and 2, when the image segmentation uses local image processing, the image is first divided into several blocks, and then these fast internal mapping is calculated. In order to enhance the value of a certain pixel 10, the difference of the mapping relationship is obtained by the mapping relationship between the blocks adjacent to the block where the pixel is located. The middle block 11 in the middle of the image is processed by bilinear interpolation (referring to the block 21, the adjacent horizontal block 22, and the vertical block 23). The horizontal block 12 on both horizontal sides of the image adopts a single linearity (referring to the block 21 and the adjacent horizontal block 22). The vertical edge blocks 13 on both vertical sides of the image are processed by using single linear interpolation (reference block 21 and adjacent vertical block 23). The corner blocks 14 at the four corners of the image are not interpolated. $d_1$ is the distance from the pixel 20 to the right edge of the adjacent horizontal block 22; $d_1'$ is the distance from the pixel 20 to the left edge of the block 21; $d_2$ is the distance from the pixel 20 to the intersection of the lower edges of the adjacent vertical blocks 23; $d_2'$ is the distance from the pixel 20 to the upper edge of the block 21.

However, the bilinear interpolation technique has the following disadvantages: (1) the gray scale of the diagonal block is not referenced, and when there is a big difference between the diagonal blocks, the display image cannot make the corresponding connection. (2) image edge detection and enhancement are not done. (3) linear interpolation in the local comparison smoothing process to achieve the final comparison target slower.

Therefore, it is necessary to provide a new image local contrast enhancement method.

SUMMARY

A technical problem to be solved by the disclosure is to provide an image local contrast enhancement method, which can improve the display effect of the blocks in the diagonal direction of the image and enhance the display effect of the edge and local contrast of the image in the smoothing process.

To solve the above technical problem, the first technical solution adopted by the present invention is to provide an image local contrast enhancement method, comprising: obtaining a source gray scale of a first block where a pixel is located in, a second block adjacent to the first block, a third block, and the second block is located at right side of the first block, and the third block is located below the first block; obtaining a source gray scale of a fourth block opposite to the first block where the pixel is located, and the fourth block is located at a lower right corner of the first block; respectively calculating a linear interpolation value according to the source gray scale and a distance between the pixel and the first block, the pixel and the second block, the pixel and the third block, and the pixel and the fourth block; calculating a nonlinear interpolation value of the linear interpolation value by a nonlinear function, wherein curve of the nonlinear function is a gamma curve; performing weighted calculation on the nonlinear interpolation value to obtain a target gray scale of the pixel.

In order to solve the above technical problem, the second technical solution adopted by the present invention is to provide an image local contrast enhancement method, including obtaining a first block where a pixel is located and a second block adjacent to the first block, and source gray scale of a third block; obtaining a source gray scale of a fourth block opposite to the first block where the pixel is located; respectively calculating a corresponding linear interpolation relative to the source gray scale according to the source gray scale and distance between the pixel and the first block, the pixel and the second block, the pixel and the third block, and the pixel and the fourth block; calculating the nonlinear interpolation of the linear interpolation by a nonlinear function; performing weighted calculation on the nonlinear interpolation to obtain the target gray scale of the pixel.

The beneficial effects of the present invention are as follows: compared with the prior art, the present disclosure increases the diagonal blocks referenced in adjusting the local grayscale, and can effectively reflect the diagonal direction of the image through nonlinear processing and weight calculation, enhances the display effect of the local contrast in the smoothing process, enhances the contrast display effect of the edge image, and improves the user experience.

DETAILED DESCRIPTION OF PREFERRED EMBODIMENTS

The technical solutions in the embodiments of the present invention will be described clearly and completely hereinafter with reference to the accompanying drawings. Apparently, the described embodiments are merely a part but not all embodiments of the present invention. All other embodiments obtained by a person of ordinary skill in the art based on the embodiments of the present invention without creative efforts shall fall within the protection scope of the present invention.

Figure 3:
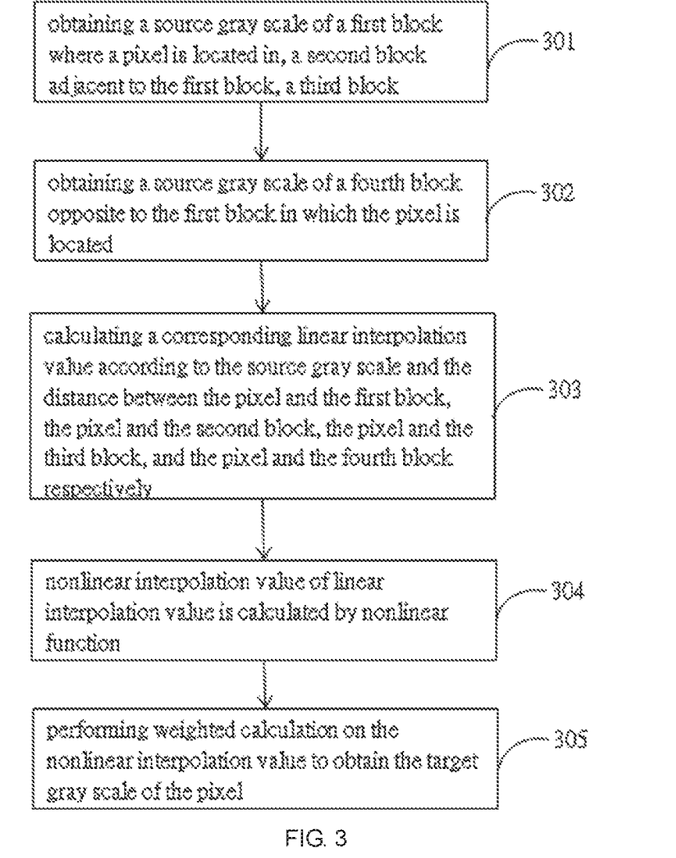
FIG. 3 is a schematic flow chart of an embodiment of an image local contrast enhancement method according to the present invention.

Referring to FIG. 3, FIG. 3 is a schematic flow diagram an image local contrast enhancement method according to the embodiment of the present invention. As shown in FIG. 3, the method of the local contrast enhancement of the present invention is as follows:

301: obtaining a source gray scale of a first block where a pixel is located in, a second block adjacent to the first block, a third block.

In the present embodiment, the image processing apparatus may be a device capable of processing images, such as a smart phone, a tablet, a camera, a video camera and the like.

Before processing the image, the image processing apparatus first needs to divide the original image into blocks, and the block division technology can be based on the prior art. For a specific division manner, see FIG. 1.

Figure 4:
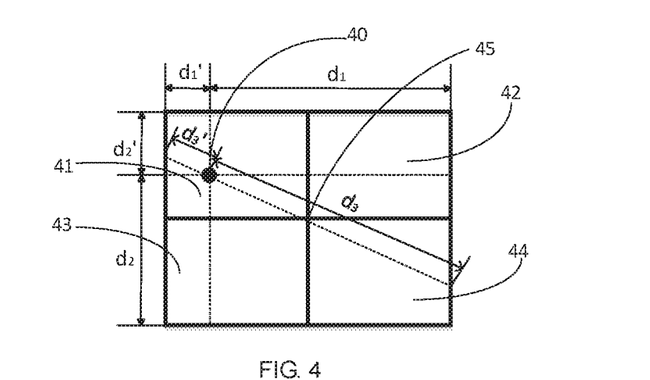
FIG. 4 is a schematic diagram of calculation of an embodiment of the image local contrast enhancement method according to the present invention.

Referring to FIG. 4, FIG. 4 is a calculating schematic diagram of an image local contrast enhancement method of an embodiment. The block where the pixel 40 is located is the first block 41; the second block 42 is adjacent to the first block 41 and is located to the right side of the first block 41; and the third block 43 is adjacent to the first block 41 and located below the first block 41

In this embodiment, the image processing apparatus sequentially obtains the source gray scale GrayUL of the first block 41 of the original image, the source gray scale GrayUR of the second block 42, and the source gray scale GrayDL of the third block 43.

302: obtaining a source gray scale of a fourth block opposite to the first block in which the pixel is located.

With continued reference to FIG. 4, the fourth block 44 is diagonally distributed with the first block 41 and located at a lower right corner of the first block 41. The image processing apparatus obtains the source gray scale GrayUL of the fourth block 44. It should be noted that the prior art bilinear interpolation method does not consider the source grayscale of the diagonal block (i.e. the fourth block 44 in the embodiment) in calculation, which may result in poor display effect of diagonal areas. However, the present invention considers the source gray scale of the diagonal block, which can enhance the display effect of the diagonal area.

303: calculating a corresponding linear interpolation value according to the source gray scale and the distance between the pixel and the first block, the pixel and the second block, the pixel and the third block, and the pixel and the fourth block respectively.

In order to clearly illustrate the position of the pixel 40, with continued reference to FIG. 4, there is a first extension line across the pixel 40 along the edge of the first block 41, and there is a second extension line across the pixel 40 vertical to the left edge of the first block 41, and there is a third extension line going through the intersection of the flour blocks and the pixel 40. $d_1$ s a distance between the pixel 40 and an intersection point of the first extension line and a right edge of the second block 42, $d_1'$ is a distance between the pixel 40 and an intersection point of the first extension line and a left edge of the first block 41, $d_2$ is a distance between the pixel 40 and an intersection point of the second extension line and a lower edge of the third block 43, $d_2'$ is distance between the pixel 40 and an intersection point of the second extension line and an upper edge of the first block 41; $d_3$ is the distance between the pixel 40 and an intersection point of the third extension line and the edge of the fourth block 44; $d_3'$ is distance between the pixel 40 and an intersection point of the third extension line and the edge of the first block 41.

In the present embodiment, the image processing device calculates the corresponding linearity according to the source gray scale and the distance between the pixel 40 and the first block 41, the second block 42, the third block 43, and the fourth block 44, respectively. Distance, source gray scale and linear interpolation value satisfy the relationship as shown in equation (1) $G_1$ is the linear interpolation value of the direction of the second block 42, $G_2$ is the linear interpolation value of the direction of the third block 43, $G_3$ is the linear interpolation value of the direction of the fourth block 44.

$$G_1 = GrayUL \times \frac{d_1}{d_1 + d_1'} + GrayUR \times \frac{d_1'}{d_1 + d_1'} \\ G_2 = GrayUL \times \frac{d_2}{d_2 + d_2'} + GrayDL \times \frac{d_2'}{d_2 + d_2'} \\ G_3 = GrayUL \times \frac{d_3}{d_3 + d_3'} + GrayDR \times \frac{d_3'}{d_3 + d_3'} \quad (1)$$

304: Nonlinear interpolation value of linear interpolation value is calculated by nonlinear function.

Because the human eye responding to the change of brightness intensity is nonlinear, the picture obtained by linear interpolation value does not accord with the characteristics of the human eye, so the gray scale needs to be further processed nonlinearly.

The image processing apparatus first calculates the contrast of the pixel 40 in the first block 41 and the contrast of the pixel 40 in the adjacent block of the first block 41.

If the contrast of the pixel 40 in the first block 41 is greater than the contrast of the pixel 40 in the adjacent block of the first block 41, the non-linear interpolation and the linear interpolation satisfy the relationship as shown in formula (2), $$G' = f_a(G), i=1,2,3 \qquad (2)$$

G' is a non-linear interpolation value. G is linear interpolation value, $f_a$ is the first non-linear function, and the absolute value of the slope of the function $f_a$ decreases as the independent variable increases. The curve of the function may be a gamma curve or a curve whose absolute value of other slopes decreases as the independent variable increases, which is not limited in the present invention. It should be noted that the slope of the function may decrease or increase with increasing argument. However, the absolute value of the slope of the function $f_a$ must decrease as the independent variable increases. This ensures that the image of the gradient is a rapid process, a higher contrast can be accelerated to achieve a higher contrast, and the local contrast display is enhanced.

Figure 5:
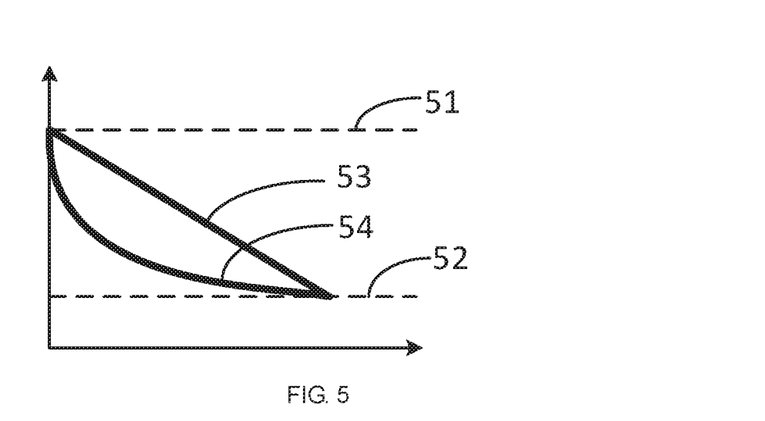
FIG. 5 is a first nonlinear function diagram of nonlinear interpolation and linear interpolation according to an embodiment of the image local contrast enhancement method of the present invention.

To clearly illustrate the first non-linear function $f_a$, referring to FIG. 5, FIG. 5 is a first nonlinear function diagram of nonlinear interpolation value and linear interpolation of an embodiment of an image local contrast enhancement method according to the present invention. As shown in FIG. 5, the abscissa is the distance, the ordinate is the grayscale, the horizontal dotted line 51 is the source gray level, and the horizontal dotted line 52 is the linear interpolation target grayscale. A function curve 53 is a linear interpolation function curve and a function curve 54 is a curve of the first nonlinear function. In conjunction with FIG. 4, for example, the gray scale of the original image pixel 40 is 50 after the image function curve 53 enhances, the target gray scale of linear interpolation of the first block 41 is 40, The target gray scale of the linear interpolation of the second block is 42, the contrast of the pixel 40 in the first block 41 is 10, and the contrast of the pixel 40 in the second block 42 is 8. The contrast from high value decreases and the gray scale is reduced, the gray scale of the pixels in the first block 41 as the curve function 54 gradually increases from 40 to 42, when the slope of the function curve 54 increases as the independent variable increases (changes gradually from negative to zero). However, the absolute value of the slope of the function curve 54 decreases as the independent variable increases.

In another specific implementation manner, the gray scale of the original image pixel 40 is 50. After the image is linearly enhanced, the target gray scale of the linear interpolation value of the first block 41 is 60, and the target gray scale of the linear interpolation target of the second block 42 is 58. The contrast of the pixel 40 in the first block 41 is 10, and the contrast of the pixel 40 in the second block 42 is 8. The contrast decreases from high but the gray scale increases, and the gray scale of the pixels in the first block 41 is gradually reduced from 60 to 58 according to the first nonlinear function curve (not shown in the figure). At this time, the slope of the first nonlinear function curve decreases as the independent variable increases (changes gradually from positive value to zero). The absolute value of the slope of the first non-linear function decreases as the independent variable increases.

If the contrast of the pixel in the first block is less than the contrast of the pixel in the adjacent block of the first block, the nonlinear interpolation value and the linear interpolation value satisfy the relationship shown in the formula (3), $$G' = f_b(G), i=1,2,3 \qquad (3)$$

G' is the nonlinear interpolation value, G is the linear interpolation value, $f_b$ is the second nonlinear function, and the absolute value of the slope of the function $f_b$ increases as the independent variable increases. It should be noted, the slope of the function $f_b$ may decrease or increase with increasing the independent variable, but the absolute value of the slope of the function $f_b$ must increase as the independent value increases. This ensures that the gradual change of the image is a slow process. You can slowly achieve lower contrast, and maintain the local contrast of the display.

Figure 6:
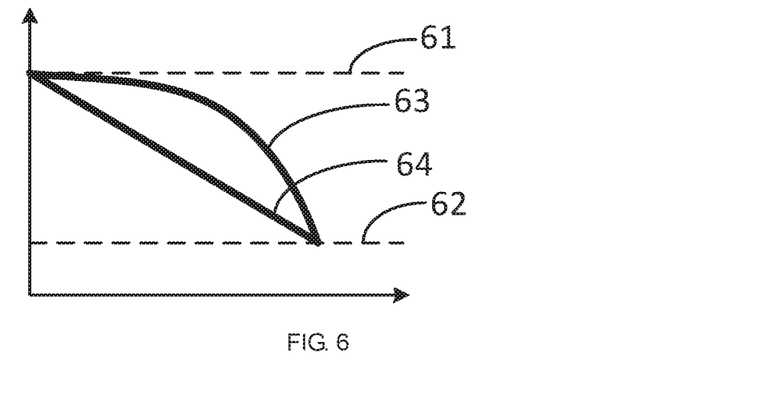
FIG. 6 is a second nonlinear function of nonlinear interpolation and linear interpolation according to an embodiment of the image local contrast enhancement method of the present invention.

In order to clearly illustrate the second nonlinear function $f_b$, referring to FIG. 6, FIG. 6 is a second function diagram of nonlinear interpolation and linear interpolation according to an embodiment of an image local contrast enhancement method of the present invention. As shown in FIG. 6, the abscissa is the distance, the ordinate is the gray scale, the horizontal dotted line 61 is the source gray scale, and the horizontal curve 62 is the target gray scale of linear interpolation value. The function curve 63 is a linear interpolation function curve, and the function curve 64 is a second nonlinear function $f_b$ curve. For example, the gray scale of the original image pixel 40 is 50, and after the image is enhanced, the target gray scale of the linear interpolation of the first block 41 is 42 and the target gray scale of the linear interpolation of the second block 42 is 40, the contrast of the pixel 40 in the first block 41 is 8, and the contrast of the pixel 40 in the second block 42 is 10. The gray scale is reduced but the contrast is increased from low to high. The gray scale of the pixels in the first block 41 as a function of curve 64 decreases gradually from 42 to 40. The slope of the function curve 64 at this time as the independent value increases (decreasing from zero to negative value), but the absolute value of the slope of the function curve 64 increases as the independent variable increases.

In another specific implementation manner, the gray scale of the original image pixel 40 is 50. After the image is enhanced, the target gray scale of the linear interpolation value of the first block 41 is 58. The target gray scale of the linear interpolation value of the second block 42 is 60. The contrast of the pixel 40 in the first block 41 is 8, and the contrast of the pixel 40 in the second block 42 is 10 Gray scale increases and the contrast is increased from a low drop. The gray scale of the pixels of the first block 41 in accordance with a second nonlinear function curve (not shown) is slowly reduced to 58 from 60. The slope of the second nonlinear function curve increases (increases from 0 to positive value) as the independent variable increases, but the absolute value of the slope of the second nonlinear function curve increases as the independent variable increases.

305: performing weighted calculation on the nonlinear interpolation value to obtain the target gray scale of the pixel.

Figure 7:
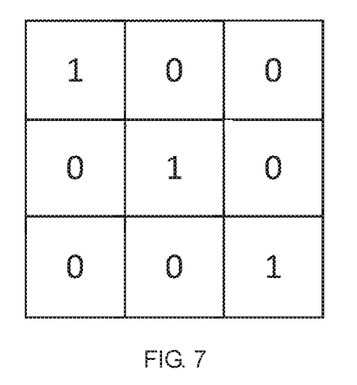
FIG. 7 is an edge of a diagonal form of an embodiment according to the image contrast enhancement method of the present invention.
Figure 8:
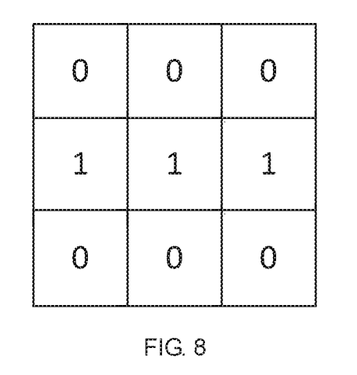
FIG. 8 is an edge of a horizontal form according to an embodiment of the image contrast enhancement method of the present invention.
Figure 9:
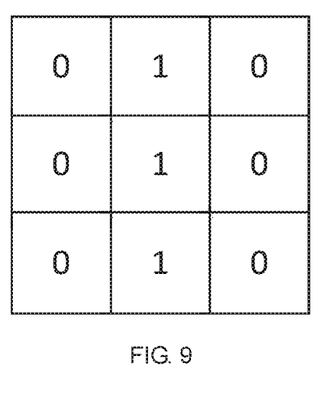
FIG. 9 is an edge of a vertical form according to an embodiment of the image contrast enhancement method of the present invention.

Since the weight of the edge and the middle position are different, it is first necessary to determine the position of the pixel 40 in the entire image. In the present embodiment, the image processing apparatus first performs binarization processing of the original image to obtain different edge forms. Referring to FIG. 7, FIG. 7 is the edge having diagonal form of an embodiment of the image local contrast enhancement method of the present disclosure. Please refer to FIG. 8. FIG. 8 is an edge having horizontal form of an embodiment of the image local contrast enhancement method of the present disclosure. Please refer to FIG. 9. FIG. 9 is an edge having vertical form of an embodiment of the image local contrast enhancement method of the present disclosure.

The image processing apparatus for an edge in the form of different forms determines different weighting coefficients, α can be calculated according to the difference of the contrast values, or α can be calculated by using a fixed proportion reduction method, which is not limited in the present invention. It should be noted that all of the weight coefficient α of the non-edge part (i.e. the middle part 11 in the prior art) are 1.

Based on the weight coefficient α and distances, the weights are calculated. Weights and distances, and weight coefficients α satisfy the relationship as shown in formula (4)

$$D_i = d_i \times \alpha \quad (i = 1, 2, 3) \atop \alpha \le 1 \quad\quad\quad\quad\quad\quad\quad\quad (4)$$

$D_i$ is the number of weights, $d_i$ is the distance, α is the weight coefficient.

The target gray scale satisfies the relationship as shown in formula (5)

$$G_{target} = \sum_{i=1}^{3} G_i \times \frac{T - D_i}{2T} \quad (i = 1, 2, 3) \atop T = \sum_{j=1}^{3} D_j \quad (j = 1, 2, 3) \quad\quad\quad (5)$$

Thereby, we can calculate the target gray scale of the entire image.

Different from the prior art, the present invention increases the referenced diagonal blocks when adjusting the local gray level, and effectively reflect the diagonal direction of the image through nonlinear processing and weight calculation. The local contrast is enhanced in the smoothing process. The edge of the image contrast display is enhanced, and the present disclosure improves the user experience.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. An image local contrast enhancement method for an image processing apparatus, comprising:
   obtaining a source gray scale of a first block where a pixel is located in, a second block adjacent to the first block and a third block, wherein the second block is located at right side of the first block, and the third block is located below the first block;
   obtaining a source gray scale of a fourth block opposite to the first block where the pixel is located, wherein the fourth block is located at a lower right corner of the first block;
   respectively calculating a linear interpolation value according to the source gray scale and a distance between the pixel and the first block, the pixel and the second block, the pixel and the third block, and the pixel and the fourth block;
   calculating a nonlinear interpolation value of the linear interpolation value by a nonlinear function, wherein curve of the nonlinear function is a gamma curve;
   performing weighted calculation on the nonlinear interpolation value to obtain a target gray scale of the pixel.

2. The image local contrast enhancement method for the image processing apparatus according to claim 1, wherein the linear interpolation, the distance, and the gray scale source satisfies relationship as shown in equation (1), $$G_1 = GrayUL \times \frac{d_1}{d_1 + d_1'} + GrayUR \times \frac{d_1'}{d_1 + d_1'} \atop G_2 = GrayUL \times \frac{d_2}{d_2 + d_2'} + GrayDL \times \frac{d_2'}{d_2 + d_2'} \atop G_3 = GrayUL \times \frac{d_3}{d_3 + d_3'} + GrayDR \times \frac{d_3'}{d_3 + d_3'} \quad (1)$$

wherein $G_1$ is a linear interpolation of direction of the second block, $G_2$ is a linear interpolation of direction of the third block, $G_3$ is a linear interpolation of direction of the fourth block, GrayUL is the source gray scale of the first block, GrayUR is the source gray scale of the second block, GrayDL is the source gray scale of the third block, GrayDR is the source gray scale of the fourth block;

wherein a first extension line is parallel to a upper edge of the first block through the pixel, a second extension line is perpendicular to the left edge of the first block through the pixel, a third extension line goes through an intersection point of the four blocks and the pixel, $d_1$ is a distance between the pixel and an intersection point of the first extension line and a right edge of the second block, $d_1'$ is a distance between the pixel and an intersection point of the first extension line and a left edge of the first block, $d_2$ is a distance between the pixel and an intersection point of the second extension line and a lower edge of the third block, $d_2'$ is distance between the pixel and an intersection point of the second extension line and an upper edge of the first block; $d_3$ is distance between the pixel and an intersection point of the third extension line and an edge of the fourth block, $d_3'$ is distance between the pixel and an intersection point of the third extension line and the edge of the first block.

3. The image local contrast enhancement method for the image processing apparatus according to claim 2, wherein if contrast of the pixel in the first block is greater than contrast of the pixel in an adjacent block of the first block, the nonlinear interpolation and the linear interpolation value satisfy the relationship as shown in formula (2):

$$G_i' = f_a(G_i), \quad i=1,2,3 \quad\quad (2)$$

wherein $G_i'$ is the nonlinear interpolation value; $G_i$ is the linear interpolation value, $f_a$ is the first nonlinear function; the absolute value of the slope of the function $f_a$ decreases as the independent variable increases.

4. The image local contrast enhancement method for the image processing apparatus according to claim 2, wherein if contrast of the pixel in the first block is less than contrast of the pixel in an adjacent block of the first block, the nonlinear interpolation value and the linear interpolation value satisfy the relationship as shown in formula (3):

$$G_i' = f_b(G_i), i=1,2,3 \quad (3)$$

wherein $G_i'$ is the nonlinear interpolation value, $G_i$ is the linear interpolation value; $f_b$ is the second nonlinear function; the absolute value of the slope of the function $f_b$ increases as the independent variable increases.

5. The image local contrast enhancement method for the image processing apparatus according to claim 3, wherein before the step of performing weighted calculation on the nonlinear interpolation value to obtain the target gray scale of the pixel, the method further comprises:
- binarizing an original image is to obtain different edge forms;
- determining different weighting coefficients α for different forms of the edge form.

6. The image local contrast enhancement method for the image processing apparatus according to claim 5, wherein weight number in the weighting calculation and the distance satisfy the relationship as shown in the formula (4)

$$Q_i = d_i \times \alpha \ (i = 1, 2, 3) \\ \alpha \le 1 \quad (4)$$

wherein $Q_i$ is the number of weights, $d_i$ is the distance, α is the weight coefficient.

7. The image local contrast enhancement method for the image processing apparatus according to claim 6, wherein the weight coefficients α of non-edge portions of the original image are 1.

8. The image local contrast enhancement method for the image processing apparatus according to claim 7, wherein the target grayscale satisfies a relationship as shown in the formula (5)

$$G_{target} = \sum_{i=1}^{3} G_i' \times \frac{T-Q_i}{2T} (i = 1, 2, 3) \\ T = \sum_{j=1}^{3} Q_j \ (j = 1, 2, 3) \quad (5)$$

9. An image local contrast enhancement method for an image processing apparatus, comprising:
- obtaining a first block where a pixel is located and a second block adjacent to the first block, and source gray scale of a third block;
- obtaining a source gray scale of a fourth block opposite to the first block where the pixel is located;
- respectively calculating a corresponding linear interpolation according to the source gray scale and a distance between the pixel and the first block, the pixel and the second block, the pixel and the third block, and the pixel and the fourth block;
- calculating the nonlinear interpolation of the linear interpolation by a nonlinear function;
- performing weighted calculation on the nonlinear interpolation to obtain the target gray scale of the pixel.

10. The image local contrast enhancement method for the image processing apparatus according to claim 9, wherein the second block is located at right side of the first block, the third block is located below the first block, and the fourth block is located at a lower right corner of the first block.

11. The image local contrast enhancement method for the image processing apparatus according to claim 10, wherein distance, the linear interpolation and gray scale source satisfies relationship as shown in equation (1), $$G_1 = GrayUL \times \frac{d_1}{d_1 + d_1'} + GrayUR \times \frac{d_1'}{d_1 + d_1'} \\ G_2 = GrayUL \times \frac{d_2}{d_2 + d_2'} + GrayDL \times \frac{d_2'}{d_2 + d_2'} \\ G_3 = GrayUL \times \frac{d_3}{d_3 + d_3'} + GrayDR \times \frac{d_3'}{d_3 + d_3'} \quad (1)$$

wherein $G_1$ is a linear interpolation value of direction of the second block, $G_2$ is a linear interpolation value of direction of the third block, $G_3$ is a linear interpolation of direction of the fourth block, GrayUL is the source gray scale of the first block, GrayUR is the source gray scale of the second block, GrayDL Is the source gray scale of the third block, GrayDR is the source gray scale of the fourth block; a first extension line is parallel to an upper edge of the first block through the pixel, a second extension line perpendicular to the left edge of the first block through the pixel, a third extension line through an intersection point of the four blocks and the pixel, $d_1$ is a distance between the pixel and an intersection point of the first extension line and a right edge of the second block, $d_1'$ is a distance between the pixel and an intersection point of the first extension line and a left edge of the first block, $d_2$ is a distance between the pixel and an intersection point of the second extension line and a lower edge of the third block, $d_2'$ is distance between the pixel and an intersection point of the second extension line and an upper edge of the first block; $d_3$ is distance between the pixel and an intersection point of the third extension line and an edge of the fourth block, $d_3'$ is distance between the pixel and an intersection point of the third extension line and the edge of the first block.

12. The image local contrast enhancement method for the image processing apparatus according to claim 11, wherein if contrast of the pixel in the first block is greater than contrast of the pixel in an adjacent block of the first block, the nonlinear interpolation value and the linear interpolation value satisfy the relationship as shown in formula (2):

$$G_i' = f_a(G_i), i=1,2,3 \quad (2)$$

wherein $G_i'$ is the nonlinear interpolation; $G_i$ is the linear interpolation, $f_a$ is the first nonlinear function; the absolute value of the slope of the function $f_a$ decreases as the independent variable increases.

13. The image local contrast enhancement method for the image processing apparatus according to claim 11, wherein if contrast of the pixel in the first block is less than contrast of the pixel in an adjacent block of the first block, the nonlinear interpolation value and the linear interpolation value satisfy the relationship as shown in formula (3)

$$G_i' = f_b(G_i), i=1,2,3 \quad (3)$$

wherein $G_i'$ is the non-linear interpolation, $G_i$ is the linear interpolation; $f_b$ is the second nonlinear function; the absolute value of the slope of the function $f_b$ increases as the independent variable increases.

14. The image local contrast enhancement method for the image processing apparatus according to claim 13, wherein before the step of performing weighted calculation on the nonlinear interpolation value to obtain the target gray scale of the pixel, the method further comprises:
  binarizing an original image to obtain different edge forms;
  determining different weighting coefficients $\alpha$ for different forms of the edge form.

15. The image local contrast enhancement method for the image processing apparatus according to claim 14, wherein weight number in the weighting calculation and the distance satisfy the relationship as shown in the formula (4):

$$\left.\begin{array}{l} D_i = d_i \times \alpha \ (i=1,2,3) \\ \alpha \le 1 \end{array}\right\} \quad (4)$$

wherein $D_i$ is the number of weights, $d_i$ is the distance, $\alpha$ Is the weight coefficient.

16. The image local contrast enhancement method for the image processing apparatus according to claim 15, wherein the weight coefficients $\alpha$ of non-edge portions of the original image are 1.

17. The image local contrast enhancement method for the image processing apparatus according to claim 16, wherein the target grayscale satisfies a relationship as shown in the formula (5)

$$\left.\begin{array}{l} G_{target} = \sum_{i=1}^{3} G_i \times \dfrac{T - D_i}{2T} (i=1,2,3) \\ T = \sum_{j=1}^{3} D_j \ (j=1,2,3) \end{array}\right\}. \quad (5)$$

18. The image local contrast enhancement method for the image processing apparatus according to claim 9, wherein curve of the nonlinearity function the is a gamma curve.

* * * * *